United States Patent [19]

Ebrahimzadeh

[11] Patent Number: 4,647,102
[45] Date of Patent: Mar. 3, 1987

[54] WINDSHIELD CURTAIN

[76] Inventor: Mozaffar Ebrahimzadeh, 3515 Hickory Hill Dr., Arlington, Tex. 76014

[21] Appl. No.: 835,236

[22] Filed: Mar. 3, 1986

[51] Int. Cl.$^4$ .................................................. B60J 3/00
[52] U.S. Cl. .............................. 296/97 D; 160/84 R; 160/DIG. 2; 296/95 C; 296/97 R
[58] Field of Search ................ 296/97 R, 95 C, 97 D, 296/97 C; 160/84 R, DIG. 2, DIG. 3, 368 S

[56] References Cited

U.S. PATENT DOCUMENTS

| | | | |
|---|---|---|---|
| 3,751,100 | 8/1973 | Keyes | 296/95 C |
| 4,109,957 | 8/1978 | Polizzi et al. | 296/95 C |
| 4,202,396 | 5/1980 | Levy | 160/84 R |
| 4,442,881 | 4/1984 | Monteath et al. | 296/97 D |

Primary Examiner—Robert R. Song
Attorney, Agent, or Firm—John K. Abokhair

[57] ABSTRACT

A removable curtain assembly for covering the inside of a vehicle windshield, said curtain assembly comprising: an opaque vertically pleated panel having outer dimensions sufficient to cover the interior of said windshield while retaining sufficient strength in the pleats to hold said panel in unfolded position adjacent to said windshield; at one end of said panel, a rigid rod having a sufficient amount of suction cups attached thereto, to attach and hold the curtain assembly to the inside of said windshield; and at the other side of said panel, a tension rod of sufficient length such that when the tension rod is vertically placed adjacent to the windshield and between the windshield housing material, the tension rod has sufficient tension to hold the curtain assembly in place.

5 Claims, 3 Drawing Figures

WINDSHIELD CURTAIN

FIELD OF THE INVENTION

The present invention relates, generally, to windshield curtain assemblies. More particularly, the present invention relates to a retractable and removable curtain assembly for covering the inside of a vehicle windshield.

BACKGROUND OF THE INVENTION

Windshield curtains are utilized for numerous reasons, mainly for protection from sun damage to the interior of a car, for privacy especially in recreational vehicles and vans, and for reducing heat build-up in an automobile parked in the sun.

Some of the heretofore available windshield curtains are supported by conventional curtain rods or tracks which do not allow for the easy removal of the curtain assembly if desirable. Furthermore, when the curtain or curtains are moved to their open position, they tend to distract the driver or obstruct the driver's vision due to their bulkiness. The curtain supporting hardware must also be permanently affixed to the interior of the vehicle, thus, damaging the interior thereof.

U.S. Pat. No. 4,109,957 discloses a quickly removable curtain assembly for covering the inside of a vehicle windshield. The curtain assembly disclosed therein includes an opaque cloth panel for covering the windshield and front side windows of a vehicle such as a van or recreational vehicle. While this curtain assembly is removable, it is not retractable. To remove the bulky material, one would have to fold it in some manner to reduce its size to a size manageable for storage.

Other advantages and benefits of the present invention are described hereinafter.

SUMMARY OF THE INVENTION

The present invention provides a removable and retractable curtain assembly for covering the inside of a vehicle windshield. The assembly may be left on the windshield in a folded or retracted position while the vehicle is being driven. The windshield assembly of the present invention comprises an opaque vertically pleated panel having outer dimensions sufficient to cover the interior of said windshield while retaining sufficient strength in the pleats to hold the panel against the windshield. At one end of the vertically pleated panel is a rigid rod having a sufficient amount of suction cups attached thereto to attach and hold the curtain assembly to the inside of said windshield. Preferably, the suction cups are attached to the rigid rod by means allowing the adjustability of the distance between said suction cup and rigid rod. Preferably, this rigid rod houses a string drawing or retracting mechanism. At the other end of the vertically pleated panel is an adjustable tension rod of sufficient length such that when the tension rod is placed vertically adjacent to the windshield and between the windshield housing material, the rod has sufficient tension to hold the curtain assembly in place.

DETAILED DESCRIPTION OF THE PREFERRED EMBODIMENTS

Figure 1:
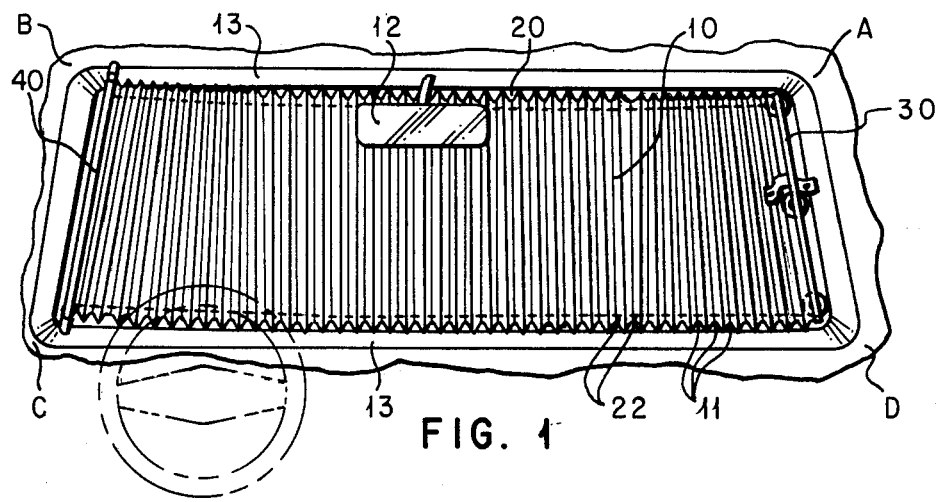
FIG. 1 shows a windshield curtain assembly in accordance with the present invention in the unfolded position and secured to the interior of a vehicle windshield.

While the present invention is described in terms of a windshield curtain assembly, it should be noted that the present invention can be utilized in other similar fashions. The description is limited to windshield curtains because of the unique problems associated therewith.

The present invention relates to a retractable and removable curtain assembly for covering the inside of a vehicle windshield. The unique problems associated with such include the fact that the windshield of a vehicle is not uniform. The windshield is usually wider at the bottom as compared to the top. Additionally, the windshield is rarely, if ever, truly vertical. Furthermore, the windshield of a vehicle is usually more curved than other windows on the vehicle. Accordingly, a windshield curtain assembly would have to overcome the above unique problems.

In addition to overcoming the above problems, the windshield curtain assembly of the present invention is easily removable and can be retracted to a small compact unit for storage on the windshield or otherwise.

Accordingly, the curtain assembly of the present invention comprises an opaque vertically pleated panel having outer dimensions sufficient to cover the interior of the windshield while retaining sufficient strength in the pleats to hold the panel in position. The panel can be made of any opaque material, such as cloth, paper and the like. In accordance with one embodiment of the present invention, the outside facing of the panel comprises reflective material. Since the windshield is not truly vertical (i.e., slopes to the outside) the pleats serve to give the material sufficient strength to prevent the panel from falling or folding away from the windshield. Thus, the panel should have a sufficient outside dimension to allow the panel to cover the windshield and retain the pleats narrow enough to support the panel. Another purpose for the pleats is to allow the nonuniform extension of the curtain panel. This is necessary due to the fact that windshields do not usually have a uniform width. Normally, the lower part of a vehicle windshield is wider than the top thereof. Thus, the pleats allow the unfolding of the panel to cover the whole of the windshield. Yet another advantage of the pleats is to allow the neat and easy folding and unfolding of the windshield curtain. This is of significant importance when folding the curtain, particularly since this function allows the folding of the curtain without having to completely remove the curtain from the windshield. To facilitate such ease of folding, a drawstring mechanism can be employed. The draw-string mechanism makes the folding even easier in that it takes up the pleated panel as the curtain is folded. An automatic drawing mechanism can be employed in place of the string mechanism. Some vehicles have the rear-view mirror attached to the windshield. Accordingly, the pleated panel may have a cutout in the top section thereof in order to accommodate such. In either case, the rear-view mirror can be utilized to support the pleated panel when unfolded. Additionally, the sun visors can be folded down to hold the panel in place.

At one end of the pleated panel, the curtain assembly comprises a rigid rod having a sufficient amount of suction cups attached thereto, to attach and hold the curtain assembly to the inside of a windshield. Preferably, the rigid rod is on the passenger side of the windshield. This is less obtrusive to the driver when the curtain assembly is folded but still attached to the interior of the windshield. This rigid rod is preferably hollow and can house the draw-string mechanism. Additionally, this rod can optionally have means to secure the extra string or rope when the curtain assembly is either folded or unfolded. Furthermore, this rod may also have means to secure the curtain in its folded position.

At the other end of the pleated panel, the curtain assembly comprises an adjustable tension rod of sufficient length such that when the tension rod is placed adjacent to the windshield and between the windshield housing material, the rod has sufficient tension to hold the curtain assembly in place.

The curtain assembly of the present invention will now be described in more detail in accordance with preferred embodiments with reference to the drawings. Accordingly, as shown in FIG. 1, the curtain assembly comprises an opaque vertically pleated panel 10. The outer dimensions of the pleated panel are sufficient to cover the interior of the windshield 20 while retaining sufficient strength in the pleats 11 to hold the panel in position against the interior of the windshield. The panel is preferably made from opaque cloth due to the large variety of colors and prints available and due to its durability. In most vehicles, the windshield is not vertical, i.e., the bottom part CD is further away from the driver than the top part AB. Furthermore, the bottom part CD is usually wider than the top part AB. The pleats serve to prevent the panel from falling or breaking away from the windshield due to the sloping of the windshield, by giving added strength in the vertical direction. Furthermore, the pleats allow added stretching along the bottom of the windshield CD as compared to the top thereof AB, thus covering all the inside of the windshield 20 despite its non-uniformity.

At one end of the pleated panel 10, the curtain assembly comprises a rigid rod 30 having a sufficient amount of suction cups 31 attached thereto, to attach and hold the curtain assembly to the inside of the windshield. While preferably at least two suction cups 31 are needed, it is preferred to use three or more. The suction cups are preferably attached to the rigid rod 30 by means which allow the adjustability of the distance between the suction cup 31 and the rigid rod 30. This is advantageous particularly since the windshield is not flat and the curvature varies among the several makes of motor vehicles. As shown in the drawings, the suction cups 31 are attached to the rigid rod 30 by element 35 which can slide under screw 34 to adjust the distance between each suction cup and the rigid rod. Rigid rod 30 is preferably hollow and made of light metals or alloys. This hollow section would be able to house the string or rope of the draw-string mechanism. The draw-string would exit through hole 32 and the excess wound around the two prongs 33. Preferably, the draw-string mechanism is completely housed in the rigid rod 30, thus eliminating the need for hole 32 and prongs 33.

Figure 2:
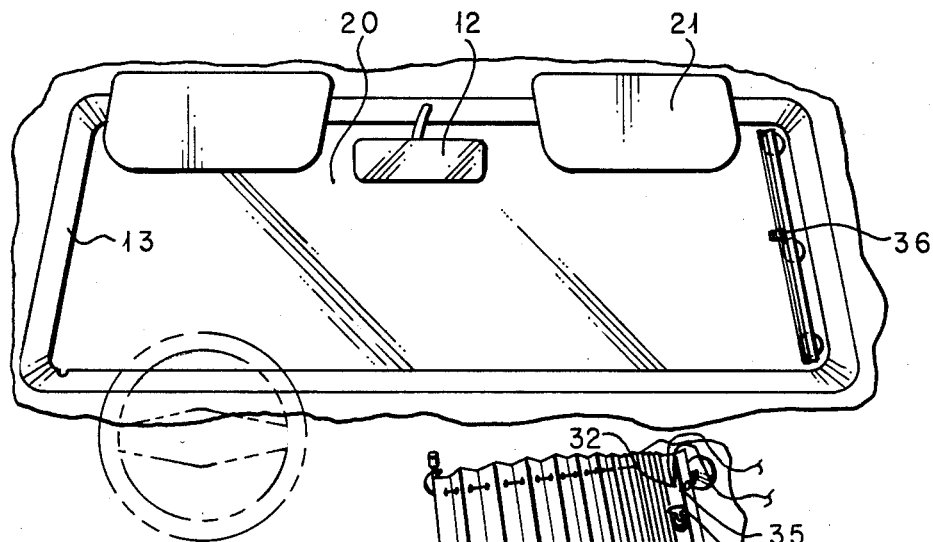
FIG. 2 shows a windshield curtain assembly in accordance with the present invention in its folded or retracted position and secured to the interior of a vehicle windshield.
Figure 3:
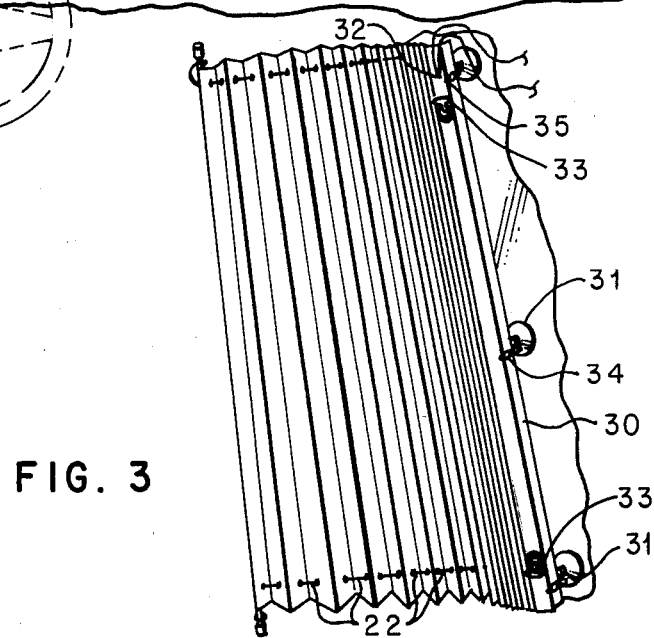
FIG. 3 is a detailed view of a windshield curtain assembly in accordance with the present invention.

At the other end of the pleated panel, the curtain assembly comprises an adjustable tension rod 40. The tension rod is of sufficient length such that when the tension rod is placed next to the windshield 20 and between the windshield housing material 13, the rod has sufficient tension to hold the curtain assembly in place. This is applicable whether the curtain assembly is unfolded as shown in FIG. 1 or folded up as shown in FIG. 2.

The draw-string mechanism would work in a similar manner as to mechanisms employed in window mini-blinds and the like. However, at least one modification is necessary. Since the windshield, and thus the windshield curtain, is not of uniform width, the draw-string mechanism should not draw the moveable end at a uniform distance. One should be able to draw one end while the other is stationary. Other modifications are evident from the descriptions above.

Although the present invention has been described with preferred embodiments, it is to be understood that modifications and variations may be resorted to, without departing from the spirit and scope of this invention, as those skilled in the art will readily understand. Such modifications and variatons are considered to be within the purview and scope of the appended claims.

What I claim is:

1. A removable curtain assembly for covering the inside of a vehicle windshield, said curtain assembly comprising:
    (a) an opaque vertically pleated panel having outer dimensions sufficient to cover the interior of said windshield while retaining sufficient strength in the pleats to hold said panel in unfolded position adjacent to said windshield;
    (b) at one end of said panel, a rigid rod having a sufficient amount of suction cups attached thereto, to attach and hold the curtain assembly to the inside of said windshield; and
    (c) at the other side of said panel, a tension rod of sufficient length such that when the tension rod is vertically placed adjacent to the windshield and between the windshield housing material, the tension rod has sufficient tension to hold the curtain assembly in place.

2. The curtain assembly of claim 1 wherein the rigid rod has at least three suction cups attached thereto.

3. The curtain assembly of claim 1 wherein the suction cups are attached to said rigid rod by means allowing the adjustability of the distance between said suction cups and said rod.

4. The curtain assembly of claim 1 further comprising a draw-string assembly attached to the tension rod and drawn through the rigid rod.

5. The curtain assembly of claim 1 further comprising means for retracting the curtain assembly into folded position.

* * * * *